(12) United States Patent
Park (10) Patent No.: US 12,394,259 B2
(45) Date of Patent: Aug. 19, 2025

(54) SERVICE SYSTEM OF AN INTELLIGENT PERFORMANCE INSPECTION FOR A USED CAR, AND METHOD THEREOF

(71) Applicants: OCMOBILE CO., LTD., Seoul (KR); Jun Young Park, Seoul (KR)

(72) Inventor: Jun Young Park, Seoul (KR)

(73) Assignees: OCMOBILE CO., LTD., Seoul (KR); Jun Young Park, Seoul (KR)

( * ) Notice: Subject to any disclaimer, the term of this patent is extended or adjusted under 35 U.S.C. 154(b) by 202 days.

(21) Appl. No.: 18/257,293

(22) PCT Filed: Dec. 21, 2021

(86) PCT No.: PCT/KR2021/019507
§ 371 (c)(1),
(2) Date: Jun. 14, 2023

(87) PCT Pub. No.: WO2022/139409
PCT Pub. Date: Jun. 30, 2022

(65) Prior Publication Data
US 2024/0013593 A1    Jan. 11, 2024

(30) Foreign Application Priority Data
Dec. 23, 2020  (KR) .................. 10-2020-0182670

(51) Int. Cl.
*G07C 5/08*    (2006.01)
(52) U.S. Cl.
CPC ........... *G07C 5/0808* (2013.01); *G07C 5/085* (2013.01)

(58) Field of Classification Search
CPC ............................ G07C 5/0808; G07C 5/085
See application file for complete search history.

(56) References Cited

U.S. PATENT DOCUMENTS

2021/0295243 A1*  9/2021  Tang .................. G06Q 30/0611

FOREIGN PATENT DOCUMENTS

| JP | 2005346170 A | 12/2005 |
| KR | 1020140079045 A | 6/2014 |
| KR | 1020180029543 A | 3/2018 |
| KR | 1020190023059 A | 3/2019 |
| KR | 101970641 B1 | 4/2019 |
| KR | 102094883 B1 | 3/2020 |

(Continued)

OTHER PUBLICATIONS

English Translation of KR20190023059A Title: Used Car Grade Diagnostic Method Author: Kim et al. Date: Mar. 7, 2019 (Year: 2019).*

(Continued)

*Primary Examiner* — James J Lee
*Assistant Examiner* — Steven Vu Nguyen
(74) *Attorney, Agent, or Firm* — CANTOR COLBURN LLP (57) ABSTRACT

The present invention includes the steps of (a) inquiring a detailed car model information of the used car; (b) collecting an unstructured data generated from mechanical or electronic devices of the car by interior/exterior photo of the used car, sound, video, and sensors; (c) performing an AI performance inspection by diagnosing the collected unstructured data through computer analysis; and (d) providing a result of the AI performance inspection to a customer along with a result of a basic performance inspection.

2 Claims, 7 Drawing Sheets

(56) References Cited

FOREIGN PATENT DOCUMENTS

KR           102305809 B1     9/2021
WO         2010074796 A1     7/2010

OTHER PUBLICATIONS

English Translation of KR20210041437A Title: Vehicle Diagnostic Using Big Data Author: Moon Hyun Ku Date: Apr. 15, 2021 (Year: 2021).*
International Search Report mailed Apr. 6, 2022 for PCT/KR2021/019507, citing the above reference(s).
'Industrial Application of Wavelet Analysis', Institute of Electrical Engineers of Japan, Joint Research Committee on Industrial Applications of Wavelet Analysis, Sep. 30, 2005, 10 pages, with English translations of the relevant portions.

\* cited by examiner

| Storing a used car in warehouse #1 | | Sound information pre-processing | car model (detailed) information inquiry |
|---|---|---|---|
| collected license plate number of a used car | 12GA0001 | Fourier transformation noise removal | (1) license plate number to be queried => 12GA0001<br>(2) inquired car model Information => vehicle identification number=KN12345678A123456; brand=Hyundai; model=Grandeur IG; Trim=3.0 gasoline; detailed trim=Exclusive Special; transmission=auto; drive=front wheel; Model=2017 model year; Production=February 2019; model name=HG4EBK-G; ride capacity=5; prime mover type=G6DG; Displacement=2999; body length=4920; body width=1860; Airbag=Advanced; Option=Around view; Tire=19 inch; Sunroof=Y; ... |
| collected sound signal | [waveform] | | |
| ... | ... | ... | ... |

| Error diagnosis and DB prediction | Combination with car model information | Storing a used car in warehouse or vehicle leaves | |
|---|---|---|---|
| (1) Engine failure - No. 3 injector failure<br>(2) Defective front right lower arm bushing | (1) license plate number to be queried => 12GA0001<br>(2) inquired car model Information => vehicle identification number=KN12345678A123456; brand=Hyundai; model=Grandeur IG; Trim=3.0 gasoline; detailed trim=Exclusive Special; transmission=auto; drive=front wheel; Model=2017 model year; Production=February 2019; model name=HG4EBK-G; ride capacity=5; prime mover type=G6DG; Displacement=2999; body length=4920; body width=1860; Airbag=Advanced; Option=Around view; Tire=19 inch; Sunroof=Y; ...<br>(3) failure information : Engine failure - No. 3 injector failure<br>(4) Preventive maintenance required: Defective front right lower arm bushing | license plate number of a used car | 12GA0001 |
| | | content of information display device | (1) Failure information: engine failure - No. 3 injector failure<br><br>(2) Preventive maintenance required: Defective front right lower arm bushing<br><br>(3) Recommended repair shop: Ganada repair shop, 300m, lowest price |
| | ... | ... | ... |

FIG. 5

SERVICE SYSTEM OF AN INTELLIGENT PERFORMANCE INSPECTION FOR A USED CAR, AND METHOD THEREOF

TECHNICAL FIELD

This application claims a priority based on Korean Patent Application No. 10-2020-0182670 filed on Dec. 23, 2020, and all contents disclosed in the specification and drawings at filing of the application are included in this application.

The present invention relates to an intelligent performance inspection service system for a used car and a method thereof, and more particularly, to a system and a method for providing an intelligent performance state inspection unit that can check an analysis result by computer or AI etc. and a basis data thereof through online, the analysis result being for an emotional quality index capable of checking through online an emotional quality such as noise, vibration, etc. generated during engine operation or car driving.

BACKGROUND ART

In general, in a used car transaction, people who want to buy a used car visit a large local used car market and select the used car by being introduced or by visiting and looking at the used car for sale. But even in these cases, most of them decide whether or not to buy the used car by car registration book, insurance accident history, and performance inspection table of the car. And if they know some about cars, they start the engine themselves, and the reality is that there are very few cases of actual test driving unless it is an expensive car or something.

In recent years, online transactions have been activated, and furthermore, non-face-to-face transactions have been activated, and it is an unsatisfactory transaction because it is required to judge by a written confirmation for the used car as in the past and to judge by only a small amount of information in at least online. As a result, customers who purchase these used cars do not have information on driving or engine condition, so unfair transactions are made in a situation of extreme information asymmetry. If the purchased car caused problems, they think they have been cheated, which leads to a climate of distrust for a used car trading industry as a whole. It is harming both customers and workers in the used car industry in a way that makes customers welcome an entry of large companies having reliable recognition or brand recognition into the used car industry.

Regarding an inspection of performance condition and its certificates, which are essential for the transaction of used cars, currently professional inspectors visually check repairs and replacements of parts and leaks of various parts, and issue the certificates. However, online transactions and non-face-to-face transactions are increasing, and even if the car is purchased online or offline, it is common for customers not to know about an emotional quality that occurs when the engine is running or while the car is driving.

Alternatively, Patent Registration No. KR 10-1970641 provides more reliable used car market price information by calculating a performance inspection cost expected in the future and calculating the used car market price by reflecting a performance inspection guarantee insurance for the expected performance inspection cost, and a used car trading system that reflects the performance inspection guarantee insurance, which can reduce a burden of used car performance inspection costs for used car customers through performance inspection guarantee insurance.

However, the used car industry still needs auxiliary means to expand customers' options, and they do not mean an information delivered by paper only, but require direct or indirect experience of a sound of driving car or a sound generated by the engine. In this way, an intelligent performance inspection service suitable for the era of the 4th industry is required.

DISCLOSURE

Technical Goal

The present invention is created in consideration of the above points, and the purpose of the present invention is to provide an intelligent performance inspection service system and method for used cars that can provide an unstructured data to customers online, and the unstructured data being sound or video generated from driving or engine of a car, and the unstructured data is analyzed by AI learning to give a normal and error deviations, and to give index for emotional quality.

Another object of the present invention is to provide an intelligent performance inspection service system and method for used cars that provides a state information of car performance anywhere in the world by making them available online or mobile, and the state information being collected by additional sound, video, and sensors during performance inspection for the emotional quality of parts where it is difficult to know the state of the car professionally when trading used cars online or offline.

Technical Solution

In order to achieve the above object, the present invention includes: (a) inquiring a detailed car model information of the used car; (b) collecting unstructured data generated from mechanical or electronic devices of the used car by interior/exterior photo of the used car, sound, video, and sensors; (c) performing an AI performance inspection by diagnosing a collected unstructured data through a computer analysis; and (d) providing a result of the AI performance inspection along with a result of a basic performance inspection to a customer.

Additionally, the method may further comprise providing a history data about the AI performance inspection even after a sale of the used car is completed.

The step (b) collects a sound signal through a microphone installed inside or outside the used car or a smartphone owned by a user, and the step (c) performs generating a sound information data by digitizing the sound signal among the collected unstructured data; detecting abnormal symptoms of the used car by mapping the sound information data with an error DB for each car model that was previously databased; and generating an abnormal symptom report when an abnormal symptom is found in the sound information data and generating a normal report when there is no abnormal symptom and reflecting the reports to the result of the AI performance inspection.

In the step (d), the result of the AI performance inspection and the result of the basic performance inspection may be provided to the customer terminal online.

According to another aspect of the present invention, an intelligent performance inspection service system includes a performance checklist generation module that inquires a detailed car model information of a used car, and collects an unstructured data generated by mechanical or electronic devices of the car by interior/exterior photo, sound, video, and sensors of the used car, and diagnoses a collected unstructured data through computer analysis to perform an AI performance inspection to check the car's performance; and an unstructured data transmission unit for providing a result of the AI performance inspection generated by the performance checklist generation module along with a result of a basic performance inspection to a customer.

The performance checklist generation module may provide a history data about the AI performance inspection even after the sale of the used car is completed.

The performance checklist generation module may include a car model information inquiry unit that obtains a car model information of the used car; a sound signal acquisition unit collecting sound signals generated from mechanical or electronic devices of the used car; a sound information pre-processing unit generating sound information data by digitizing the collected sound signals; Error DB for each car model that stores error case information for the each car model; a car model information mapping unit configured to map the sound information data with the error DB for each car model to detect abnormal symptoms of the used car; an sound information event extractor configured to analyze a pattern of a sound information in the sound information data and detect abnormal symptoms of the used car; and a performance information report processor generating an abnormal symptom report when an abnormal symptom is found in the sound information and generating a normal report when there is no abnormal symptom, and reflecting the reports in the results of the AI performance inspection.

The performance checklist generation module may display the result of the AI performance inspection on the customer terminal through a user interface (UI) that compares a normal performance state and a performance degradation state.

Advantageous Effects

The intelligent performance inspection service system and method for used cars according to the present invention have the following effects.

First, safety accidents can be prevented in advance by collecting and analyzing unstructured data such as sound information generated from used cars to identify normal or abnormal signs of cars in real time.

Second, by accumulating error detection data according to a car model information, similar failures and maintenance factors caused by similar parts can be found out in advance, and detailed maintenance information can be provided to accumulate detailed failure and maintenance histories.

Third, the result of the AI performance inspection is visualized and displayed on the customer terminal through a user interface (UI) that compares a normal performance state and a performance deterioration state in a graph, so that the customer can intuitively check the normal/abnormal state of the car.

Fourth, the results of AI performance inspection provided to customers become information by which customers additionally judge to resolve the asymmetry of information when trading used cars, through which a quality trust felt by customers can be restored and transactions can be further activated through the progress of online in a 4th industrialization to overcome a situation of the transactions being an industry of large corporations which was previously an industry of small/medium sized company.

Fifth, if the intelligent performance inspection system and methods are expanded to the daily use of cars such as parking lot access gates, car owners can predict how much their car is worth as a used car for sale (a remaining value). It is possible to link the systemized information even in decision-making such as operating, maintenance, buying and selling for the car, and the systemized information can be used in AI-recommended maintenance and trading points in the era of self-driving cars.

BEST MODE

Figure 1:
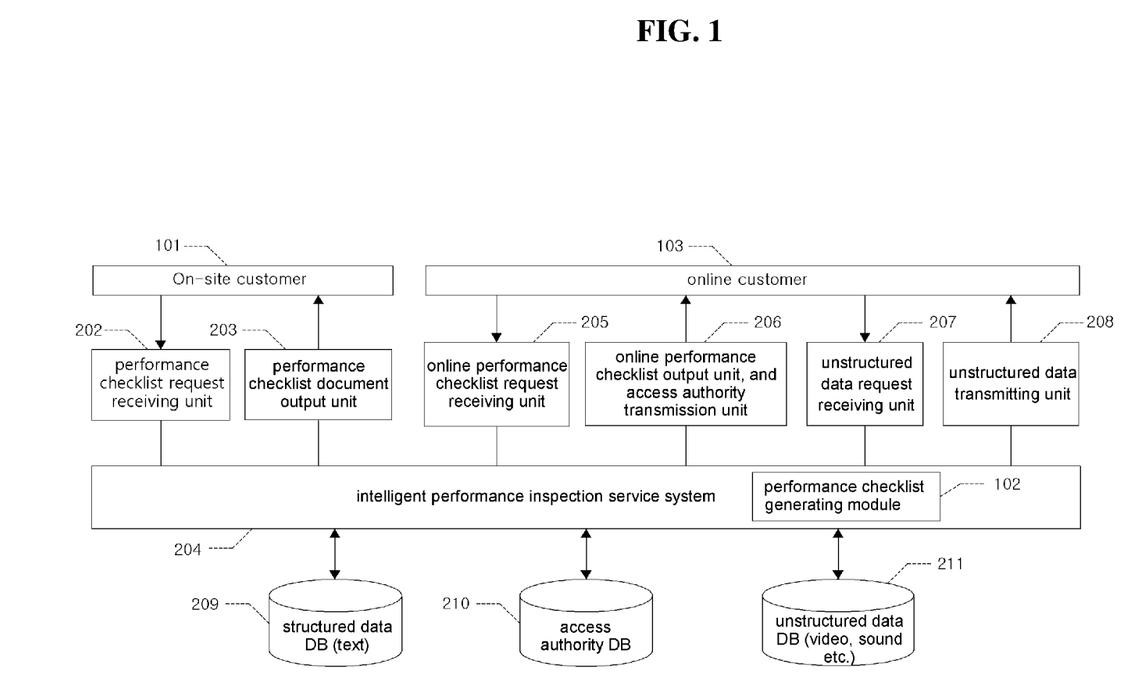
FIG. 1 is a block diagram showing a configuration of an intelligent performance inspection service system for used cars according to a preferred embodiment of the present invention.

FIG. 1 is a block diagram showing a configuration of an intelligent performance inspection service system for used cars according to a preferred embodiment of the present invention.

Referring to FIG. 1, the intelligent performance inspection service system 204 for used cars according to a preferred embodiment of the present invention includes an online performance checklist request receiving unit 205, an online performance checklist output unit and an access authority transmission unit 206, an unstructured data request receiving unit 207, an unstructured data transmitting unit 208, and a performance checklist generating module 102. In addition, the intelligent performance inspection service system 204 of the used car includes a performance checklist request receiving unit 202 and a performance checklist document output unit 203 for a customer visiting the site (car customer).

The used car intelligent performance inspection service system 204 is configured to include or interoperate with a structured data DB 209 for storing text datas to be included in items of a ordinary car performance checklist, an access authority DB 210 for storing data to provide performance inspection results only to approved users, an unstructured data DB 211 for storing unstructured data generated from mechanical or electronic devices of the car by interior/exterior photo, sound, video, and sensors of used cars.

The performance checklist generation module 102 inquires a car model information through a license plate number of the used car, and performs AI performance inspection that collects an unstructured data generated from mechanical or electronic devices of the car through photos of the inside/outside of the used car, and sound, video, and sensors, and diagnoses the collected unstructured data by a computer analysis to check the car performance.

Figure 2:
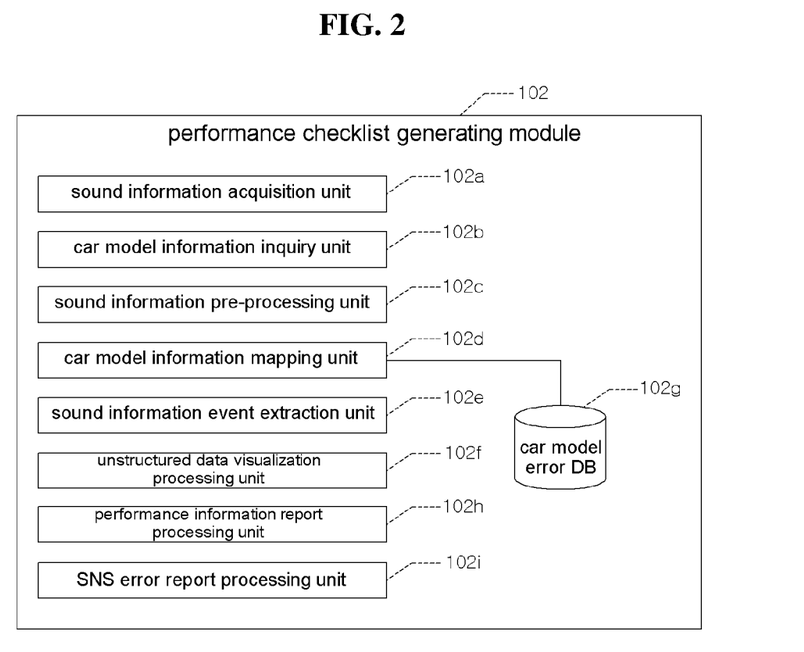
FIG. 2 is a block diagram showing a configuration of a performance checklist generating module in FIG. 1.

As shown in FIG. 2, the performance checklist generation module 102 includes a sound information acquisition unit 102a, a car model information inquiry unit 102b, a sound information pre-processing unit 102c, a car model information mapping unit 102d, and a sound information event extraction unit 102e, an unstructured data visualization processing unit 102f, a car model error DB 102g, and a performance information report processing unit 102h.

The sound information acquisition unit 102a collects sound signals generated from mechanical and electronic devices of the car.

Sound signals for detecting abnormal symptoms of the car are collected by an acoustic sensor such as a predetermined microphone installed in a passenger seat or an engine room of the car, under the car, or outside the car. Since various mechanical mechanisms such as wheel parts and drivetrains are combined in a car, it is effective to place the acoustic sensor in parts where various internal and external forces act. When installed outside the car, it can be installed at one side of facilities of a used car trading company, or it can be installed at a bottom or side of the entrance of facilities (parking lots, gas stations, car washes, repair shops, drive-through cafe, etc.) where it is easy to provide services to cars. In such places, acoustic sensors such as microphones that can detect a frequency over an audible frequency (20-20,000 Hz) are desirable to detect mechanical anomalies. Acoustic sensors collect mechanical sounds when the car is moving at a constant speed or when it is stationary. The collected sound signals are analyzed by an analysis computer connected by direct connection or communication to find out a pattern of a specific frequency.

Recognition of car plate number is performed by a camera installed at a service provider's gate facility. If the car plate number is matched with the detailed car model information of a internal system or external system and the matching is stored in a database, it is possible to group and determine abnormal signs that are specific to the car that has entered and exited the gate according to the car model, thereby recognizing abnormal signs that are due to the car model characteristics or that are due to the specific car, and using the abnormal signs as a targeted data.

The car model information inquiry unit 102b obtains a license plate number of the car and retrieves the car model information. From the number recognized by a camera installed in a gate facility, the car model information of the car is obtained from the additional information provider or public information API.

That is to say, after reading the number of '12GA1234', for example, the car model information inquiry unit 102b obtains a subdivided classification information such as 'vehicle identification number (VIN) =KN12345678A123456; Brand=Hyundai; Model=Grandeur IG; trim=3.0; Gasoline; Detailed Trim=Exclusive Special; transmission=auto; drive=front wheel; Model=2017 model year; Production=February 2019; Model Name=HG4EBK-G; Ride Capacity=5; Prime mover type=G6DG; Displacement=2999; body length=4920; body width=1860; airbag=advance; option=around view; Tires=19 inches; sunroof=Y'.

Figure 4A:
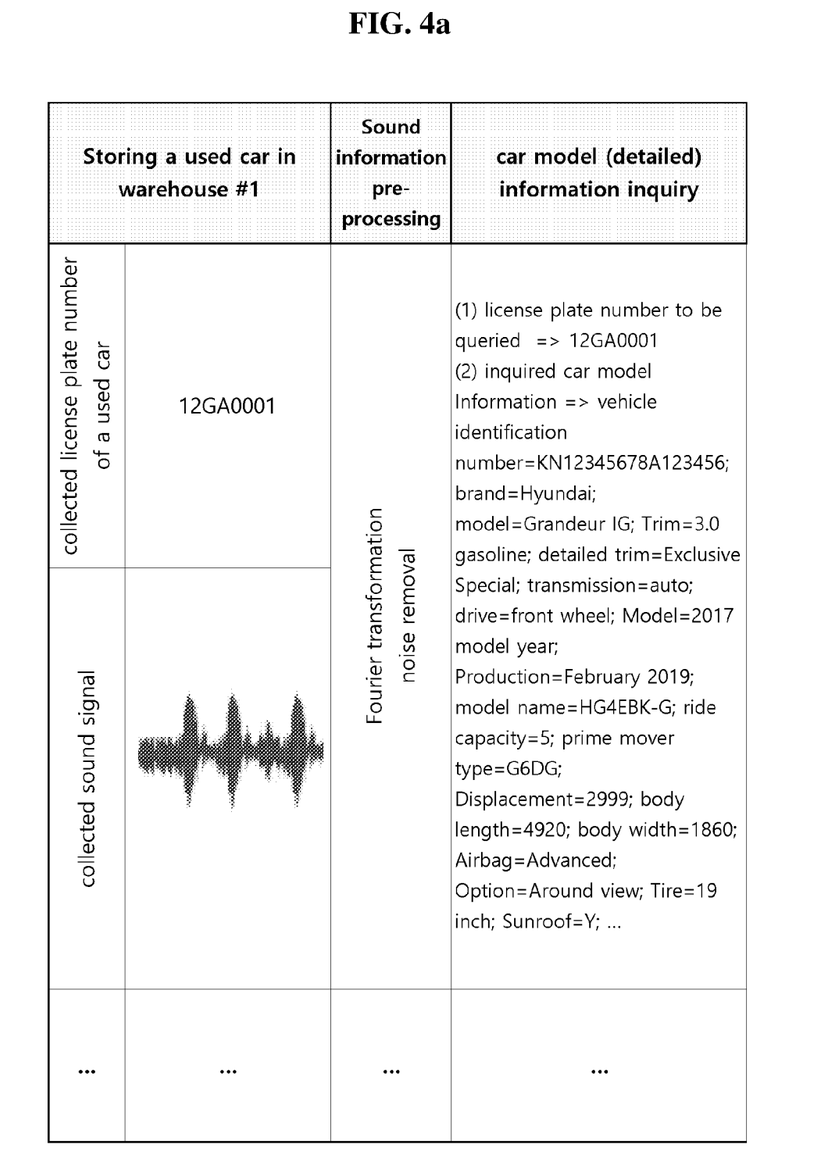
FIGS. 4a to 4c are tables exemplarily showing a sound information and a car model information processed by the used car intelligent performance inspection service system according to a preferred embodiment of the present invention.
Figure 4B:
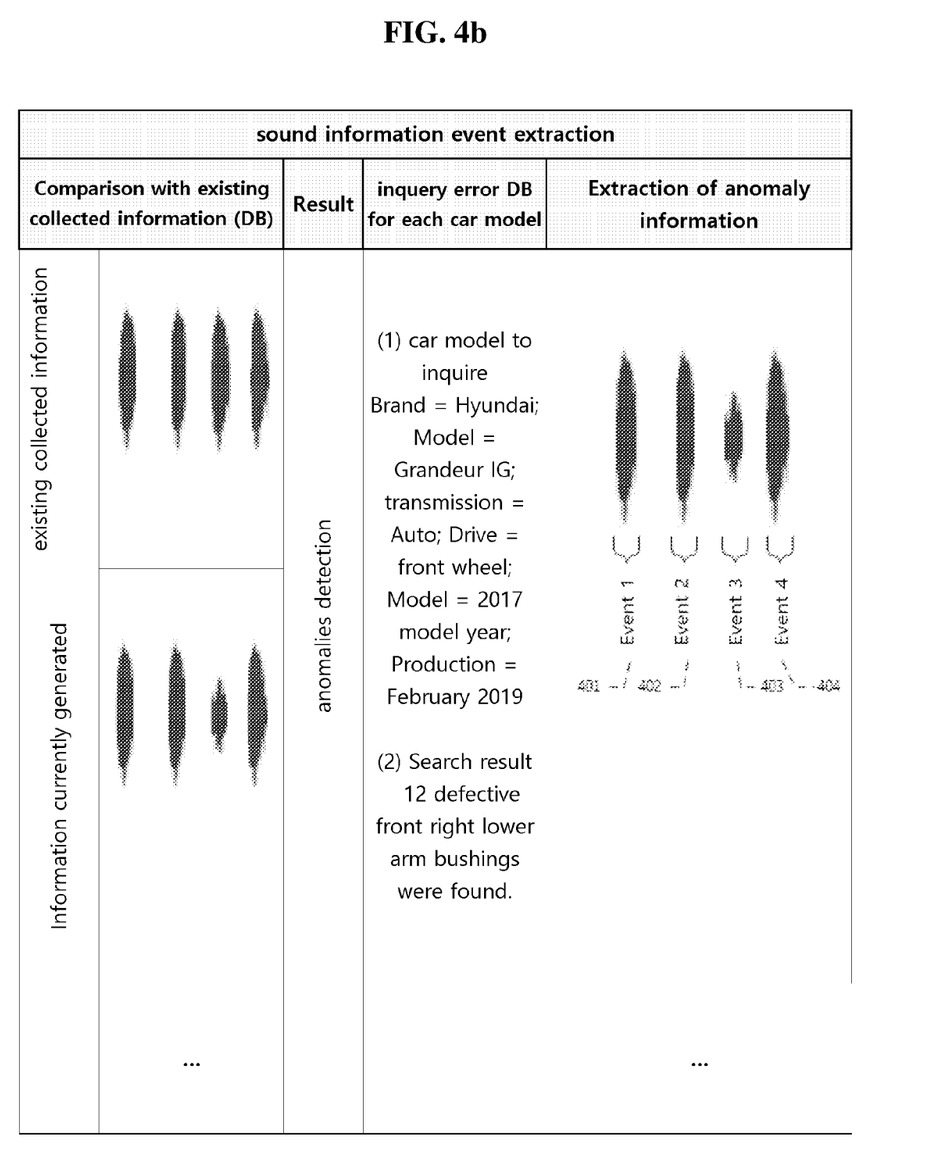
Figure 4C:
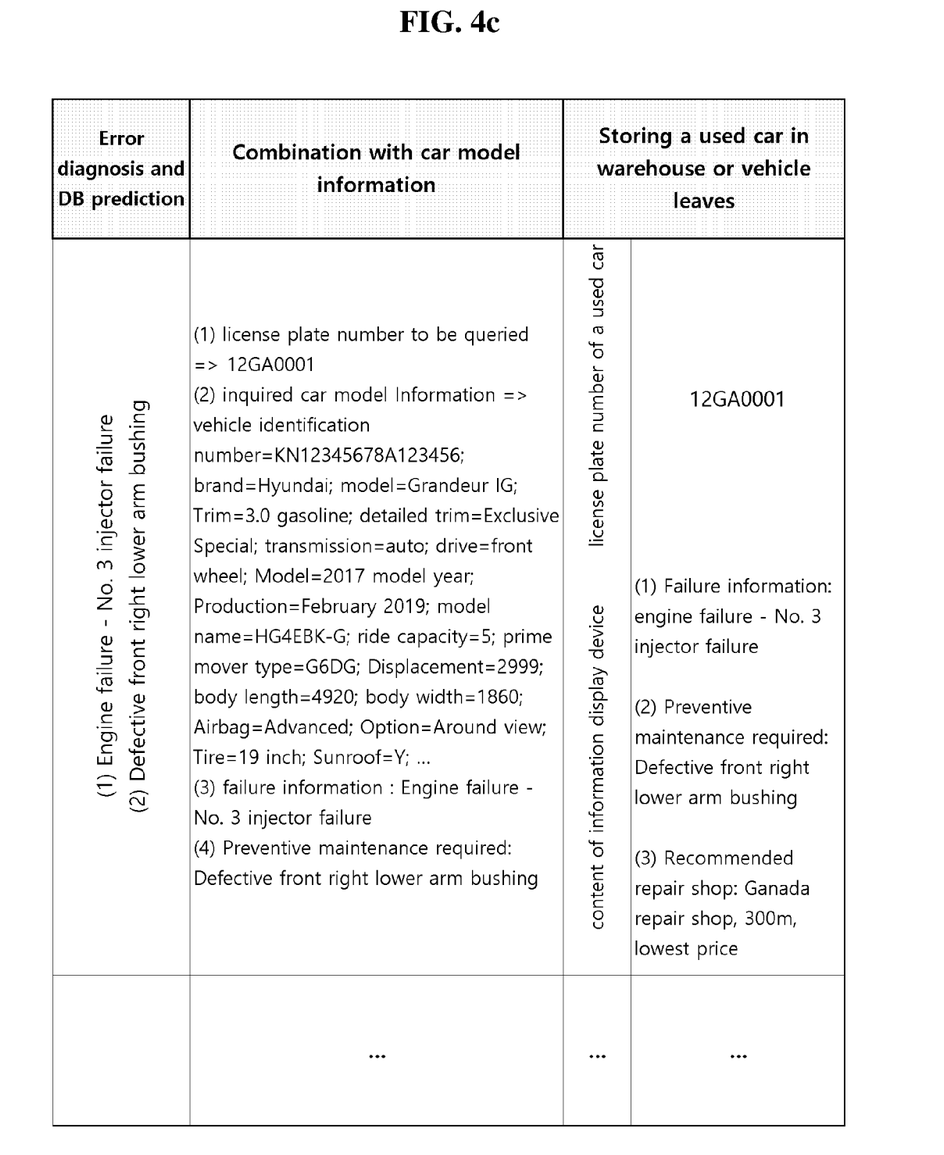

The sound information pre-processing unit 102c digitizes the collected sound signals to generate a sound information data. Specifically, the sound information pre-processing unit 102c generates the sound information data composed of frequency components generated from mechanical devices of the car by performing Fourier transform and a noise removal processing on the collected sound signals as shown in FIGS. 4a to 4c.

The car model information mapping unit 102d maps the sound information data with the car model error DB 102g storing various error case informations for each car model to detect abnormal signs of the car.

The sound information event extraction unit 102e analyzes a pattern of the sound information for the sound information data generated by the sound information pre-processing unit 102c to detect abnormal symptom events 401 to 404 of the car. In this regard, the pattern analysis process of the sound information is schematically illustrated in FIGS. 4a to 4c.

Figure 5:
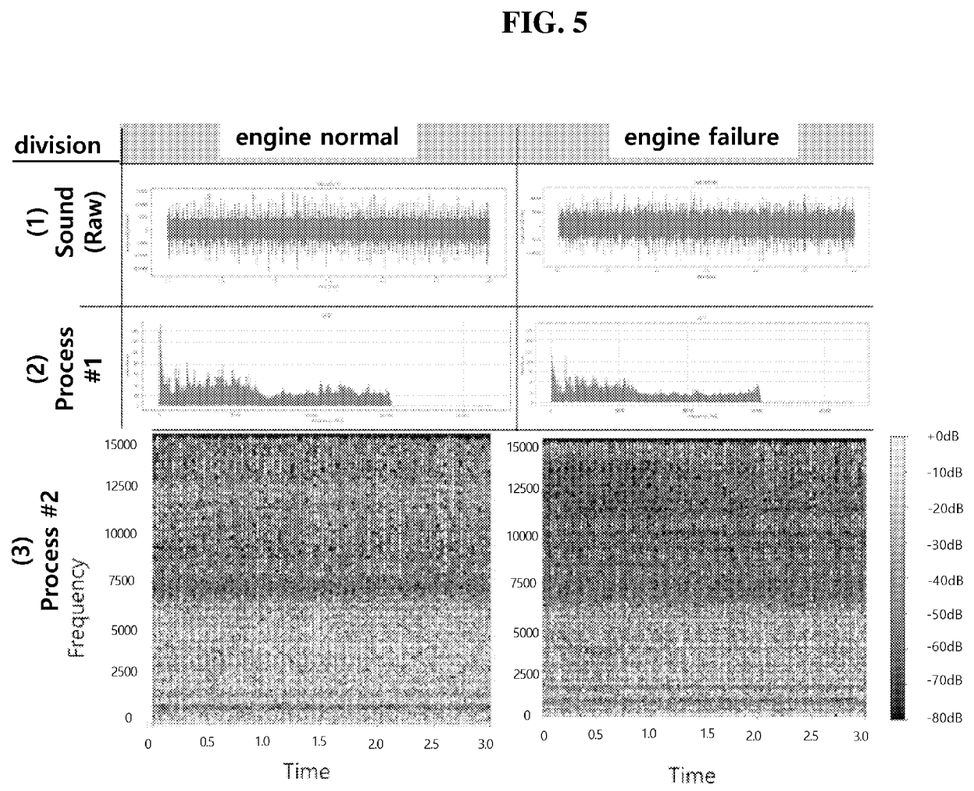
FIG. 5 is a graph showing an example of visualizing AI performance inspection results by an unstructured data visualization processing unit according to an embodiment of the present invention.

The unstructured data visualization processing unit 102f visualizes the result of the AI performance inspection to generate a car performance inspection graph. Sound waveform graphs, images, tables, etc. used in the pattern analysis process of the sound information as shown in FIGS. 4a to 4c may be reflected in the result of the AI performance inspection. More preferably, as shown in FIG. 5, the unstructured data visualization processing unit 102f performs a visualization process for the result of the AI performance inspection to display the result on the customer terminal through a user interface (UI) that compares a normal performance state and a performance degradation state by a graph. As shown in FIG. 5, when a graph for the state of performance degradation (engine malfunction) is provided to the customer, a graph of the normal state of the corresponding car model stored in advance in the unstructured data DB 211 is displayed together to inform the customer of whether or not the performance has deteriorated so that the customer can intuitively understand. Specifically, as shown in (1), (2), and (3) of FIG. 5, the visualization processing unit 102f of the performance checklist generation module 102 generates a raw waveform graph for the signal, a graph obtained by Fourier transform and noise removal processing for the sound signal, a spectrogram showing a amplitude change versus time (horizontal axis) and frequency (vertical axis) for the sound signal by a difference in density or color with respect to normal performance state and deterioration state respectively.

The performance information report processing unit 102h generates an abnormal symptom report when an abnormal symptom is found in the sound information, and generates a normal report when there is no abnormal symptom, and reflects the reports for the results of the AI performance inspection. The abnormal symptom reports or the normal reports generated by the performance information report processing unit 102h are stored in the error DB 102g for each car model.

The performance checklist generation module 102 is equipped with an SNS error report processing unit 102i, so that a reliability of the error DB 102g for each car model is increased and a data update is performed quickly. The SNS error report processing unit 102i analyzes details of errors when errors on a specific car model are reported through SNS such as Internet news or Twitter, and if they are determined that the car model has a defect, the error DB 102g for each car model updates the error data to reflect it.

The unstructured data transmission unit 208 provides the result of the AI performance inspection generated by the performance checklist generation module 102 to the customer along with the result of the basic performance inspection. At this time, the result of the AI performance inspection includes visualized information generated by the unstructured data visualization processing unit 102f.

Preferably, the used car intelligent performance inspection service system 204 provides a history data about AI performance inspection even after the sale of the used car is completed.

Figure 3:
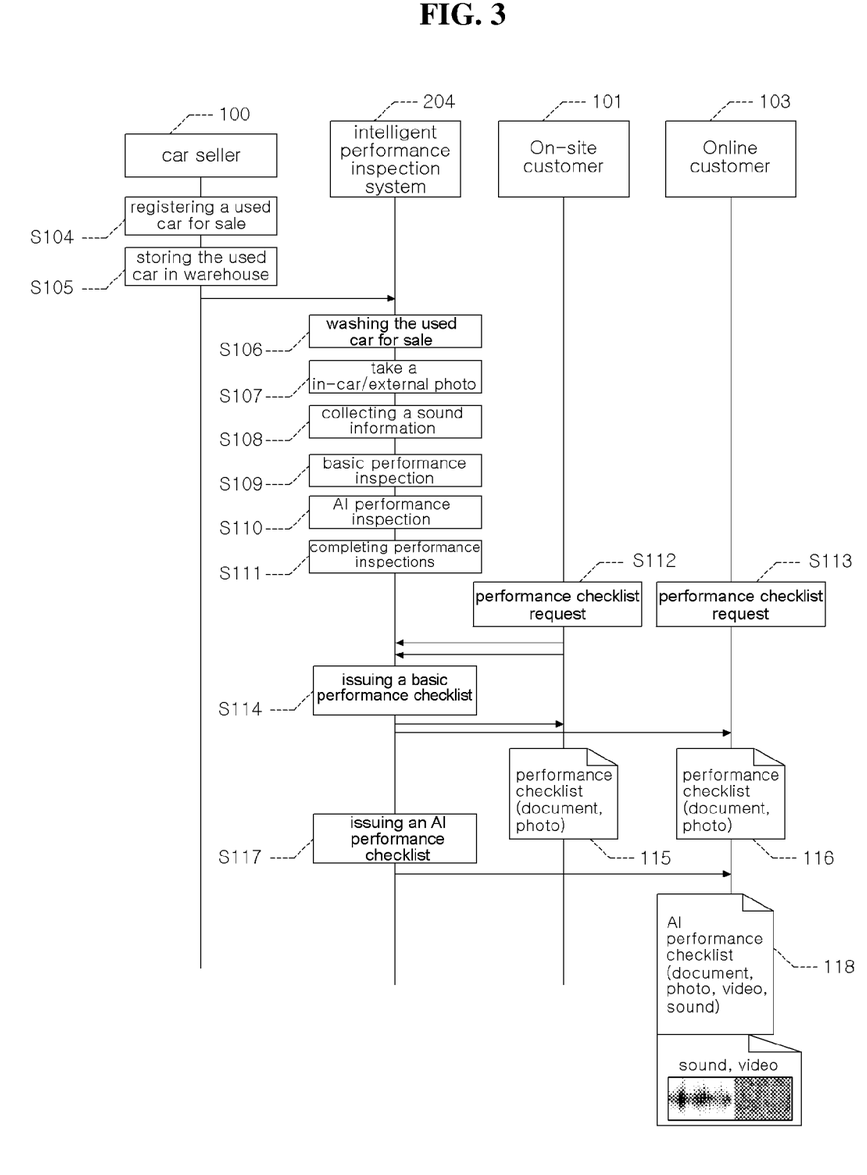
FIG. 3 is a flowchart showing a process in which an intelligent performance inspection service method for a used car is performed according to a preferred embodiment of the present invention.

FIG. 3 is a flowchart showing a service method performed by an intelligent performance inspection service system for used cars according to a preferred embodiment of the present invention.

As shown in FIG. 3, the intelligent performance inspection service method according to a preferred embodiment of the present invention is performed by mutual interactions among a car seller 100, an intelligent performance inspection service system 204, an on-site car customer 101, and an online car customer 103.

First, when a used car for sale is registered and stored by the car seller 100 (steps S104 and S105), the intelligent performance inspection service system 204 performs washing the car for sale (step S106), taking in-car/external photos (step S107), sound information collection (step S108), basic performance inspection (step S109), and AI performance inspection (step S110) sequentially to complete the performance inspection (step S111).

Thereafter, when a performance checklist request is received from the on-site car customer 101 (step S112) or a performance checklist request is received from the online car customer 103 (step S113), the intelligent performance inspection service system 204 issues a basic performance checklist primarily and provide it to the on-site car customer 101 or online car customer 103 (step S114). At this time, the performance checklist document output unit 203 provided in the intelligent performance inspection service system 204 outputs the performance checklists 115 and 116 having documents and/or photos for the basic performance information of the car for sale offline or online.

In addition, the AI performance checklist 118 is issued and transmitted to the online car customer 103 (step S117). The AI performance checklist 118 is issued by reflecting unstructured performance inspection data such as sound and video specific to the car for sales, as well as structured data in the form of documents and photos.

Specifically, the intelligent performance inspection service system 204 performs a pre-processing of Fourier transform and noise removal for the sound information signal obtained from the car after requesting a car model information, and performs an analysis on a periodic or a non-periodic and unique information by a pattern analysis through computer learning. In addition, the intelligent performance inspection service system 204 maps the analyzed information, an inquired car model information and its own error details (its own DB, public API, user information such as SNS, etc.) for each car model to evaluate and analyze whether it is a problem limited to the current car or a problem due to the characteristics of the car model. The analyzed reporting information is reflected when issuing the AI performance checklist.

Preferably, the intelligent performance inspection service system 204 visualizes the result of the AI performance inspection by generating a car performance inspection graph by using the unstructured data visualization processing unit 102*f*. The results of the AI performance inspection reflect sound waveform graphs, images, and tables etc., used in the pattern analysis process of the sound information. In addition, the unstructured data visualization processing unit 102*f* visualizes the AI performance inspection data so that the results of the AI performance inspection are displayed on the customer terminal through a user interface (UI) that compares the normal performance state and the degraded performance state in a graph.

According to another aspect of the present invention, a recording medium (for example, a magnetic recording medium, a CD-ROM, a flash memory, etc.) recording a program capable of executing on a computer a process of inquiring car model information through the license plate number of a used car; a process of collecting unstructured data generated in mechanical or electronic devices of the car through taking an interior/exterior photo of the used car and sound, video, sensor; a process of AI performance inspection for diagnosing the collected unstructured data by a computer analysis to check performance, and generating an abnormal symptom report when an abnormal symptom is found in the sound information, and generating a normal report if there is no abnormal symptom, and reflect the reports in the result of the AI performance inspection; a process for visualizing the result of the AI performance inspection to create a car performance inspection graph; and a process of providing the result of the AI performance inspection to the customer along with the result of the basic performance inspection is provided.

Although the present invention has been described above with limited examples and drawings, the present invention is not limited thereto, and various modifications and variations are possible within the technical spirit of the present invention and the equivalent scope of the claims as will be described below by those skilled in the art to which the present invention belongs.

INDUSTRIAL APPLICABILITY

According to the present invention, it is possible to collect an information suitable for mechanical characteristics and electronic characteristics additionally in addition to the result of the basic performance inspection for a car when trading the car, and provide the result report of the AI performance inspection to the customer offline or online. In addition, it is possible to promote an online used car transactions by providing even the original collected data to authorized customers, and thereby resolving an extreme asymmetry of information caused by not accurately conveying an information of the car for sale to the customer, and by the customer determining indirectly an emotional quality for purchasing a car online.

What is claimed is:

1. Service method of an intelligent performance inspection for a used car using an intelligent performance inspection service system comprising:
(a) inquiring a detailed car model information of the used car by the intelligent performance inspection service system;
(b) collecting an unstructured data generated from mechanical or electronic devices of the used car by taking interior/exterior photo of the used car, sound, video, and sensors by the intelligent performance inspection service system;
(c) performing a performance inspection by diagnosing a collected unstructured data through a computer analysis by the intelligent performance inspection service system; and
(d) outputting a result of the performance inspection by diagnosing the collected unstructured data through the computer analysis along with a result of a basic performance inspection to a customer terminal by the intelligent performance inspection service system, wherein the step (b) comprises collecting a sound signal by a microphone installed inside or outside the used car or by a smartphone owned by the user by the intelligent performance inspection service system, wherein the step (c) comprises:

generating a sound information data by digitizing the sound signal among the collected unstructured data by the intelligent performance inspection service system;

detecting abnormal symptoms of the used car by mapping the sound information data with an error DB for each car model that has been previously databased by the intelligent performance inspection service system; and generating an abnormal symptom report when an abnormal symptom is found in the sound information data by the intelligent performance inspection service system, and generating a normal report if there is no abnormal symptom by the intelligent performance inspection service system, and reflecting the reports to the result of the performance inspection by diagnosing the collected unstructured data through the computer analysis by the intelligent performance inspection service system, wherein, in the step (d), the result of the performance inspection by diagnosing the collected unstructured data through the computer analysis and the result of the basic performance inspection are provided to the customer terminal through online, wherein the result of the performance inspection by diagnosing the collected unstructured data through the computer analysis is displayed on the customer terminal through a user interface (UI) that compares a normal performance state and a performance degradation state.

2. Service method of the intelligent performance inspection for the used car according to claim 1, wherein the service method comprises providing a history data of the performance inspection by diagnosing the collected unstructured data through the computer analysis even after a sale of the used car is completed.

* * * * *